(12) United States Patent
Rabe et al.

(10) Patent No.: US 9,864,739 B1
(45) Date of Patent: Jan. 9, 2018

(54) AUTOMATIC LAYOUT OF GRAPHICAL USER INTERFACE SCREENS FROM OBJECT DATA

(71) Applicant: EMC Corporation, Hopkinton, MA (US)

(72) Inventors: Bruce R. Rabe, Dedham, MA (US); Scott E. Joyce, Foxboro, MA (US); Norman M. Miles, Bedford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 723 days.

(21) Appl. No.: 13/799,547

(22) Filed: Mar. 13, 2013

(51) Int. Cl.
G06F 17/00 (2006.01)
G06F 17/24 (2006.01)

(52) U.S. Cl.
CPC ................. G06F 17/243 (2013.01)

(58) Field of Classification Search
CPC ............ H04L 67/1097; Y10S 707/99933
USPC ........................ 715/222, 200, 227
See application file for complete search history.

(56) References Cited

U.S. PATENT DOCUMENTS

| | | | | |
|---|---|---|---|---|
| 5,353,401 A * | 10/1994 | Iizawa | ............ | G06F 17/30011 706/921 |
| 6,108,664 A * | 8/2000 | Nori | ............ | G06F 17/30595 |
| 6,411,959 B1 * | 6/2002 | Kelsey | ............ | G06F 17/246 |
| 6,718,515 B1 * | 4/2004 | Conner | ............ | G06F 17/30893 707/999.103 |
| 6,775,675 B1 * | 8/2004 | Nwabueze | ............ | G06F 17/30554 707/600 |
| 7,047,497 B2 | 5/2006 | Patrizio et al. | | |
| 7,062,502 B1 * | 6/2006 | Kesler | ............ | G06F 17/3056 |
| 7,730,428 B1 * | 6/2010 | Yehuda | ............ | G06F 3/0605 715/853 |
| 7,865,527 B2 * | 1/2011 | Bendapudi | ............ | G06F 17/245 707/793 |
| 8,402,017 B2 * | 3/2013 | Bender | ............ | G06F 17/30306 707/717 |
| 8,515,498 B2 * | 8/2013 | White | ............ | G06F 1/1626 455/566 |
| 8,601,316 B2 * | 12/2013 | Chen | ............ | G06F 1/28 714/14 |
| 2002/0091733 A1 * | 7/2002 | Chen | ............ | G06F 17/245 715/227 |

(Continued)

OTHER PUBLICATIONS

EMC, EMC Unisphere: Unified Storage Management Solution (white paper), published 2011, EMC, pp. 1-26 (PDF).*

*Primary Examiner* — Manglesh M Patel
(74) *Attorney, Agent, or Firm* — BainwoodHuang

(57) ABSTRACT

A method provides automatic layout of GUI screens based on contents of a response to a resource request. A display format is selected based on whether a resource in the response includes only a single data object (form display format) or an array of data objects (table display format). A specification is then created for a display object of the selected display format to be rendered on a GUI screen. For the form display format, the specification includes label: value pairs and location information specifying locations for the pairs in form columns. For the table display format, the specification includes a table definition (number of columns, column headings etc.) and row data values for the data objects of the array. Values are arranged in a display order of the resource fields in the response.

24 Claims, 7 Drawing Sheets

(56) References Cited

U.S. PATENT DOCUMENTS

| | | | |
|---|---|---|---|
| 2002/0116417 A1* | 8/2002 | Weinberg | G06F 17/243 |
| | | | 715/212 |
| 2003/0001885 A1* | 1/2003 | Lin | G06F 17/245 |
| | | | 715/738 |
| 2007/0162844 A1 | 7/2007 | Woodall et al. | |
| 2009/0070812 A1* | 3/2009 | Sasaki | H04N 5/44543 |
| | | | 725/39 |
| 2009/0106398 A1* | 4/2009 | Seaman, II | G06Q 30/0601 |
| | | | 709/219 |
| 2012/0198322 A1* | 8/2012 | Gulwani | G06F 17/245 |
| | | | 715/217 |
| 2014/0317093 A1* | 10/2014 | Sun | G06F 17/3033 |
| | | | 707/722 |

* cited by examiner

AUTOMATIC LAYOUT OF GRAPHICAL USER INTERFACE SCREENS FROM OBJECT DATA

BACKGROUND

Computer systems commonly employ a client-server model of interaction and data transfer. In one example, certain storage systems sold by EMC Corporation include a storage management application known as Unisphere®. A Unisphere server resides in the storage system itself and communicates with a separate Unisphere client that includes a graphical user interface (GUI). A management user operates the GUI to cause the client to engage in data transfer operations with the server to provide or obtain management-related information to/from the storage system. The client-server interface employs an architecture or technique generally referred to as Representational State Transfer, or "REST", which is based on a "resource" representation of the management data. REST requests employ resource identifiers (e.g., URIs) along with a set of basic commands such as the HTTP commands GET and POST, and REST responses include a structured text description of resource data. As an example, a storage system may represent a particular magnetic storage disk as a resource of type "disk" having a unique identifier and a set of attributes such as a size, manufacturer name, etc. The Unisphere client requests current information about the disk by issuing a request including the URI for the disk, and the Unisphere server of the storage system responds by issuing a response having a structured text description of the disk and the values of its attributes.

One feature of GUI-based client-server applications is the relationship between the structure and content of the resource data and the organization of the graphical windows or "pages" used to display the data. Continuing with the above example, the information obtained for a disk may be presented in one or more ways. For example, some portion of the information may be displayed in a multi-column table in which the data for different disks of the storage system are presented in different rows. In another context or implementation, information for a disk may be shown on a disk-specific display panel (e.g., a pane or a tabbed panel) as a list of (label, value) pairs for all attributes of the disk. In either case, the display is designed with knowledge of the data that will be used to populate it, i.e., the display is organized a priori according to the known organization of the resources and attributes, and data returned in a REST response is displayed in a predetermined manner according to the pre-designed display.

SUMMARY

One drawback to conventional REST-based client-server applications is the a priori linkage between the organization of the resource data and the corresponding organization of the GUI screens used to display the data. It may be necessary to redesign GUI screens whenever resource data having a new or revised organization are to be displayed. This may be a common occurrence in fields such as storage management in which new products and new product features, along with their management data, are regularly introduced. Although there are tools that can be used to aid such redesign in some cases, it still can be cumbersome and expensive in terms of support effort and/or missed business opportunities. Thus, it would be desirable for REST-based client-server applications to employ a more automated and flexible mechanism for tailoring the organization of GUI screens to the organization of the resource data to be displayed.

A method is disclosed of operating a computer to provide a GUI on a display to display values obtained from a response to a request for resource data. In particular, the method provides for automatic creation of certain GUI elements based on the contents of the response, removing the need for some pre-designed GUI components and enabling a system to more easily support changes in the content or structuring of resource data such as occurs in the case of product introductions or enhancements.

The method includes parsing a resource response received in response to a resource request, where the resource response includes a structured text description of a resource as one or more data objects and each data object includes a respective set of attributes each having an attribute name and attribute value. The data objects and the attributes of each data object are placed in the resource response in a display order.

In a first layout generating step, it is determined whether the resource includes only a single data object or an array of data objects, and a display format is selected by (1) for a single data object, selecting a form display format and a number of form columns to be used based on (a) the number of attributes of the single data object and (b) a width of label:value pairs to be placed in the form columns to display the attributes of the single data object, and (2) for an array of data objects, selecting a table display format and a number of table columns to be used based on (c) the number of attributes of each data object of the array and (b) respective widths of the table columns for displaying respective attribute values.

In a second layout generating step, a specification is created of a display object of the selected display format to be rendered in a graphical user interface window on the display. The specification includes, for the form display format, the label:value pairs and corresponding location information specifying respective locations of the label:value pairs in the form columns in the graphical user interface window according to the display order. For the table display format, the specification includes a table definition and row data values for the data objects, the table definition including the number of columns and respective column headings corresponding to the attribute names of the data objects in the display order, each row data value containing the attribute values for a corresponding data object of the array in the display order, the row data values being ordered according to the display order of the respective data objects of the array. The display object is then rendered on the display based on the specification.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
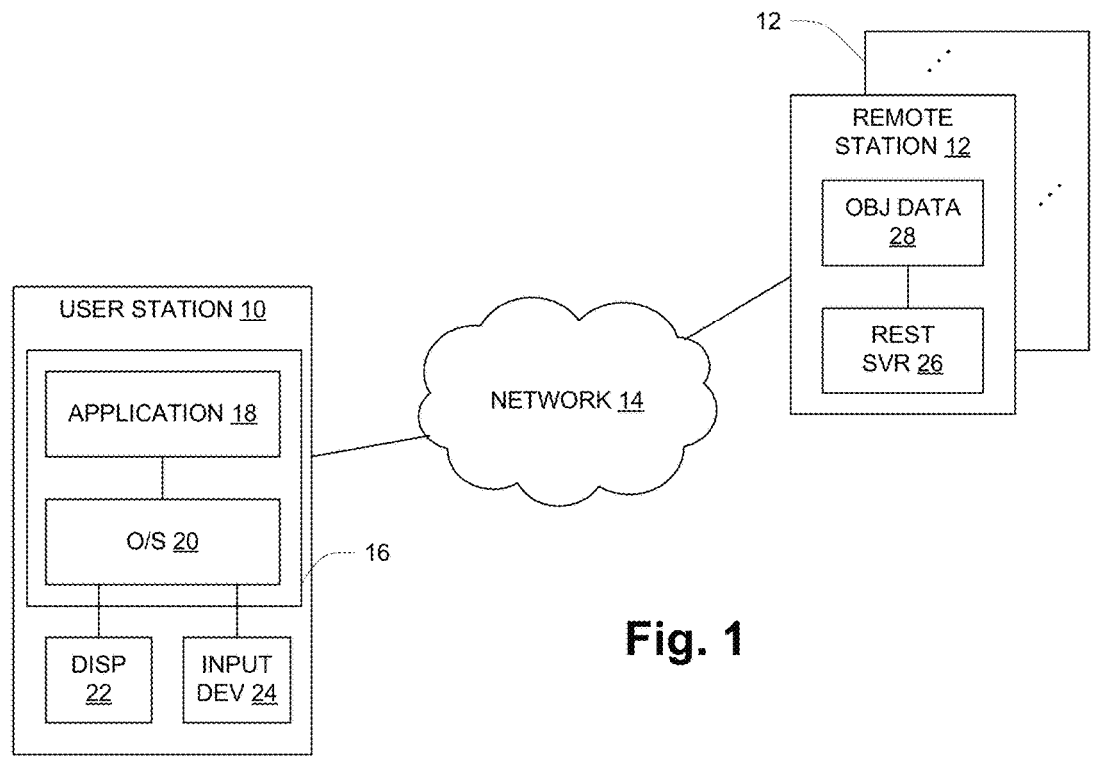
FIG. 1 is a block diagram of a client-server computer system.

FIG. 1 shows a system environment for a REST-based client-server application in which a user station 10 is coupled to one or more remote stations 12 via a network 14. As shown, the user station 10 includes computer instruction execution circuitry 16 executing an application program or "application" 18 and an operating system (O/S) 20, along with a display device or display (DISP) 22 and an input device (INPUT DEV) 24 such as a keyboard or pointer device. The remote station 12 executes a REST server (REST SVR) 26 having access to stored object data (OBJ DATA) 28. The application 18 uses the display 22 to present a graphical user interface (GUI) to a human user, specifically to display the object data 28 of the remote station 12 in a visually organized fashion.

The object data 28 may generally be any type of data presentable to a user by a visual display. Individual data items may be of different data types including character strings, numbers (e.g. integers), dates, and Boolean values, and there may be higher-level data constructs such as arrays or more general objects/structures that include sub-items of different types. Specific examples are provided below.

In one embodiment the remote stations 12 may be integrated storage systems such as those sold under the trademarks VNX® and VNXe® by EMC Corporation. Such a storage system includes a set of physical storage devices such as disks or Flash memory arrays, along with storage controllers that perform a variety of storage-related functions in presenting storage resources to external storage users. The functions may include RAID, remote replication, caching, failover, etc. The object data 28 includes information about device configuration, capacities, and operational monitoring at different levels (e.g., performance monitoring, error monitoring, and lower-level environmental monitoring) as generally known in the art. The application 18 and server 26 constitute a storage management application such as the above-mentioned Unisphere product of EMC Corporation. The application 18 issues requests for the object data 28 as organized into identified resources, and the REST server 26 provides responses containing requested resource data with a REST structuring. The interface between the application 18 and REST server 26 may be referred to as an "application programming interface" or API. In one embodiment, the API employs HTTP commands/requests such as GET, POST, etc. Response data may be provided in a markup language format such as XML or some other type of object description such as JavaScript Object Notation (JSON).

Figure 2:
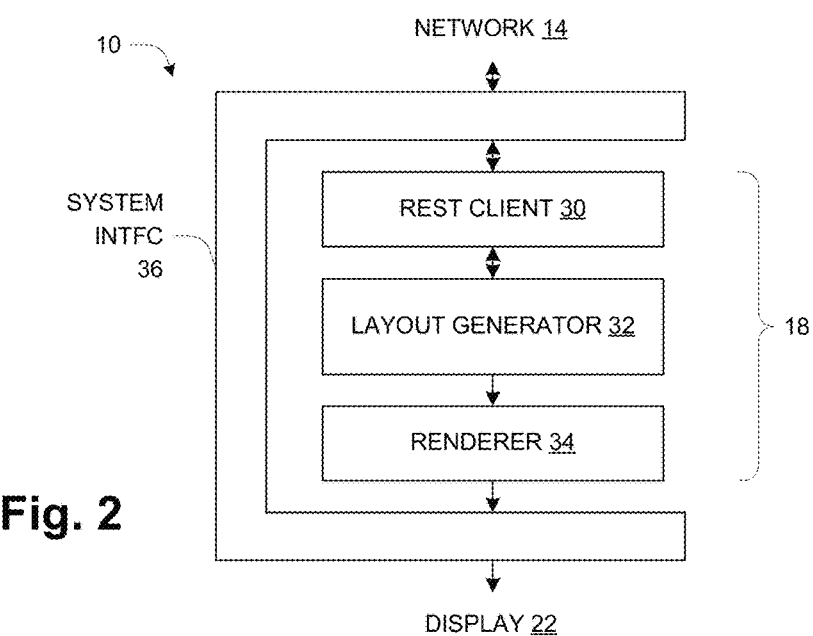
FIG. 2 is a schematic diagram of client software.

FIG. 2 shows features of the user station 10 in more detail primarily from a software perspective. The application 18 includes a REST client 30, a layout generator 32, and a renderer 34. A system interface 36 provided by the operating system 20 (FIG. 1) mediates the interaction between the application 18 and both the network 14 and the display 22. Facing the network 14, the system interface 36 provides communications functions such as IP sockets and other constructs to enable the REST client 30 to communicate with the REST server 26 of the remote station 12, as generally known in the art. Facing the display 22, the system interface 36 provides low-level functions that generate frame buffers and other data/controls for the display 22 based on graphical data generated by the renderer 34, as also generally known in the art.

As described more below, the layout generator 32 generates a specification of a layout of display objects for a GUI displayed on the display 22, and this specification is provided to the renderer 34.

Figure 3:
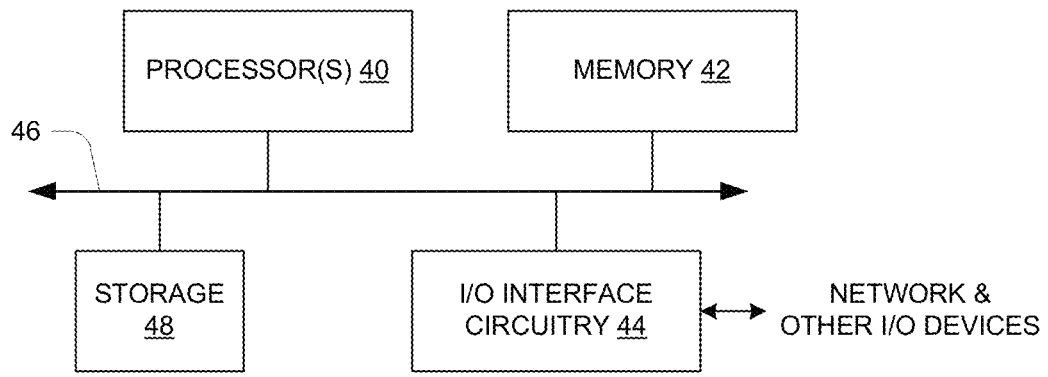
FIG. 3 is a hardware block diagram of a computer.

FIG. 3 shows an example configuration of a physical computer such as a user station 10 or remote station 12 from a computer hardware perspective. The hardware includes one or more processors 40, memory 42, and I/O interface circuitry 44 interconnected by data interconnections 46 such as one or more high-speed data buses 46. The interface circuitry 44 provides a hardware connection to the network 14 (FIG. 1) and perhaps other external devices/connections (EXT DEVs). The processor(s) 40 with connected memory 42 may also be referred to as "processing circuitry" herein. As mentioned, there may also be local storage 48 such as a local-attached disk drive or Flash drive. In operation, the memory 42 stores data and instructions of system software (e.g., operating system) and one or more application programs which are executed by the processor(s) 40 to cause the hardware to function in a software-defined manner. Thus the computer hardware executing instructions of a client application, such as described below, can be referred to as a client circuit or client component, and it will be understood that a collection of such circuits or components can all be realized and interact with each other as one or more sets of computer processing hardware executing different computer programs as generally known in the art.

The following is an example REST response for a "storage system" resource, useful to illustrate certain operational features described below.

```
{
  "@base"="https://10.6.7.41/api/instances/storageSys-
    tem";
  content={
    name=APM0000013753;
    mgmtIp="192.168.53.185";
    model=VNXe3300;
    productSerialNo=APM0000013753;
    address={
      locationName="EMC Corporation 228 South
        Street";
    },
    rackLocation=Rtp;
    lastContactTime="2012-01-04T16:48:40.967Z";
  };
  links=({href="/APM0000013753"; rel=self;});
}
```

The above is an example of a single object (storage system) having a set of attributes (name, management IP address, etc.). For a resource containing an array of objects, the response contains an instance or block of text statements as above repeated for each object. For example, a response for a resource constituted by two or more storage systems might include the above block of statements for one of the systems and a second block for the other system. The attributes listed in each block would be the same, but any instance-specific values would differ (such as name).

One feature of the present technique is that the object attributes are listed in the response in the order they should be displayed—generally most important to least important. Said differently, the layout generator 32 will generate a list or table to be displayed and populate its contents following the order in which the elements are listed in the response, which is also referred to as a "display order" herein. Referring to the above example of a single object, the display order of the attributes is (name, mgmtIp, model, productSerialNo, address, rackLocation, lastContactTime). For an array, there is a first ordering by the ordering of the objects, then an ordering of the attributes of the objects according to the ordering of the attributes in the response.

Figure 4:
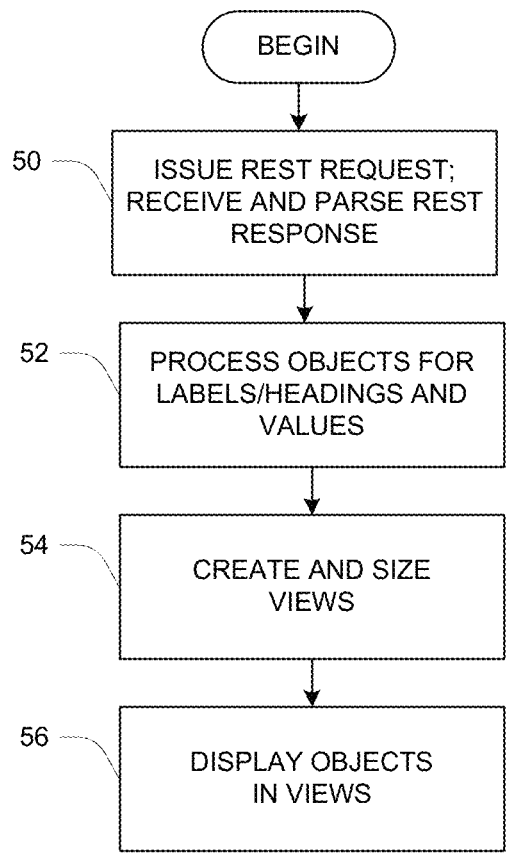
FIGS. 4-7 are flow diagrams of operations of a client.

FIG. 4 illustrates pertinent high-level operation of the application 18 including the layout generator 32 (FIG. 2). In this particular embodiment, automated layout is directed primarily to displaying the data of either a single object (e.g., a storage system or a disk) or an array of similar objects (e.g., the set of disks of a storage system). Part of the process involves identifying which type of data is being returned, then performing the layout task accordingly.

Referring to FIG. 4, at 50 the REST client 30 issues a REST request to the REST server 26 and receives and parses a corresponding REST response. In the remaining steps, the objects returned in the response are processed for automated layout and display. Specifically, at 52 each object is processed to generate/obtain labels, headings and values as the case may be. As described below, for a single or non-array object, its attributes are displayed in a form view as label:value pairs, so for such objects the labels and values to be displayed are generated. For an array object, the attributes of its constituent sub-objects are displayed in a table view, where a row is used for each sub-object and a column is used for each attribute. Column headings are created from the attribute names in the response, and cell values are obtained from the attribute values in the response. It may typically be preferred that the attribute appearing first for each sub-object is a name or other unique identifier, such that the cells in the first column serve as row headings, each identifying the sub-object whose data appears in the corresponding row. More detail about this process is given below.

At 54, the views for the objects are created, which is based on the structure of the objects (whether single or array) as well as the number and sizes of their attribute names and values. For single objects a form view is selected, as well as an arrangement for the label:value pairs for the object's attributes. The arrangement is based partly on the sizes of the label:value pairs relative to the size of the panel used for the form. If the form is narrow or the widest label:value pair requires the entire width of a panel, then a single-column listing format may be chosen. For wider panels and narrower label:value pairs, they may be arranged in multiple columns. Illustrative examples are provided below.

For an array object, a table view is selected. This requires selection of columns widths, which in turn depend on the sizes (widths) of the attribute values. In some cases it may be desired to use fixed-width columns, in which case it is necessary to size the columns according to the largest (widest) value appearing among the attributes of the object. Referring to the above example, the product serial number may be used to size the columns. Although the location and contact time are longer, they can be made narrower by dividing them into multiple parts to be displayed in multiple sub-rows within a cell, such as illustrated below:

EMC Corporation
228 South Street
2012-01-04
16:48:40.967Z

When sizing columns for an object having a large number of attributes, it may be desirable to examine some number N of the attributes and choose a size based on the widest attribute value in this sample. In one case a suitable value for N may be 10.

At 56, the objects are displayed in the views. For a form view, the label:value pairs are inserted into the view in order of the attributes in the response. For a table view, the column headings are populated in order of the attributes, and the rows are populated in order of the sub-objects in the response, with the cells in each row containing the respective attribute values for the corresponding sub-object.

Figure 5:
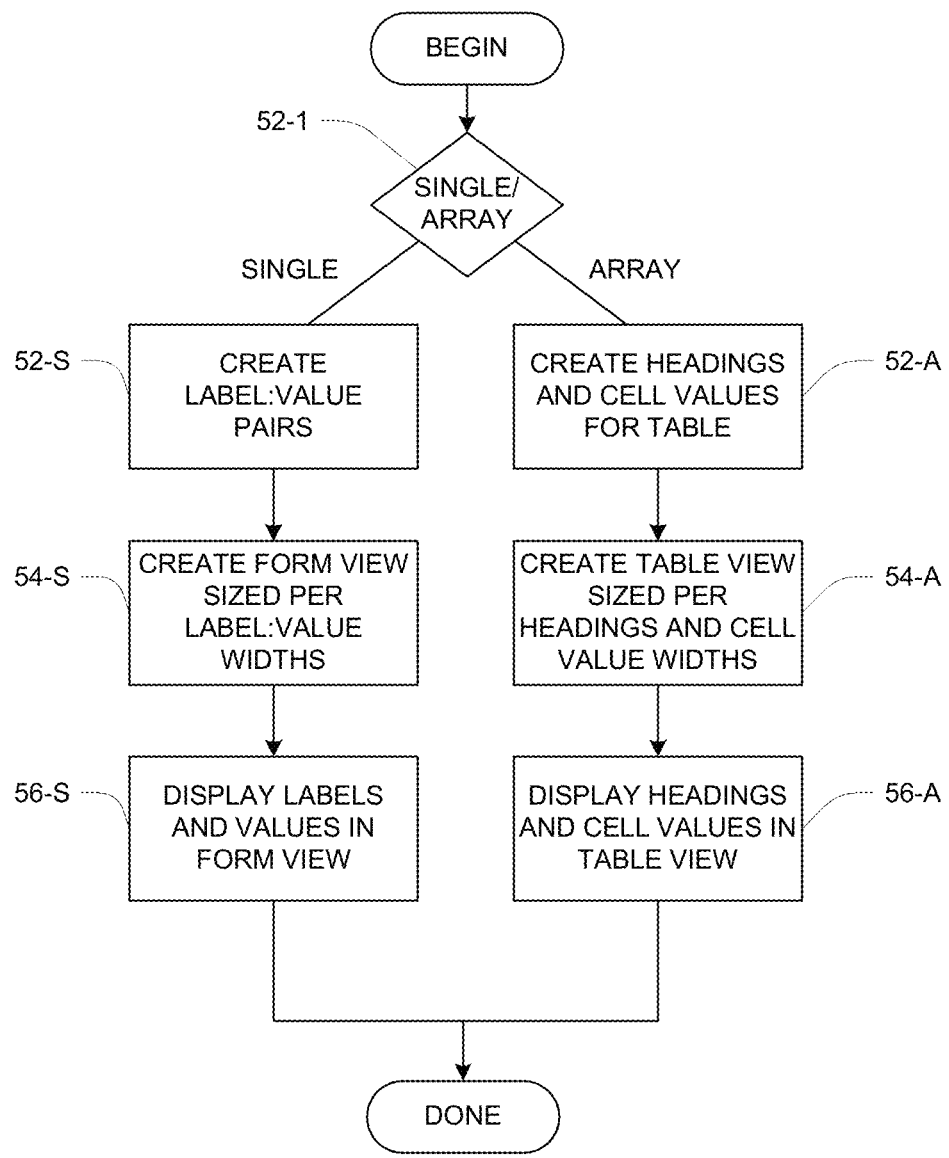

FIG. 5 illustrates certain processing from FIG. 4 for an individual object. It will be appreciated that this processing is repeated for other objects in the response. The processing of step 52 of FIG. 4 is shown as including a test at 52-1 and alternative sub-processes 52-S or 52-A. At 52-1 it is tested whether the object is a single object or an array of objects, also referred to as "sub-objects" herein. At 52-S a single object is processed to generate label:value pairs based on the attribute names and values in the REST response for the object. At 52-A, an array object is processed to generate column headings and cell values based on the attribute names and values of the sub-objects of the array object. Details of these processes are provided below.

For a single object, a form view is created at 54-S, sized according to the widths of the label:value pairs from 52-S. A form may be realized as a pane of a multi-pane window, or as a tabbed panel that may overlap with other panels and be selected/deselected to reveal or hide the panel contents. The form (panel) may be sized based on the number of attributes to be displayed and the sizes (character count) of the labels and values for the attributes. Each attribute in the response will be displayed as a label:value pair, arranged into one or multiple columns depending on the width of the panel being used. For the above example having seven fields, a single column having the seven label:value pairs might be used if the panel has a portrait-style aspect ratio, whereas for a panel having more of a landscape-style aspect ratio it may be desirable to distribute the seven label:value pairs across two shorter columns.

At 56-S, the labels and values from 52-S are displayed in the form created in 54-S. Formatting may be used. For example, labels may be right justified and may be followed by a separator such as a colon character. Formatting for values may depend on type. For example, data values may be formatted differently from character or string values, and different types of data values (e.g., integers, floating point values, dates, etc.) may be formatted differently. Additional information about formatting is given below.

If an array is identified at 52-1, then at 52-A the attribute names are used to create column headings and the attribute values are used to create cell values to populate a table. Then at 54-A the table is created. The column headings are placed in the first row, and the values are placed in corresponding cells. Each sub-object in the array is placed in a separate row of the table, with the cells of each column displaying a respective attribute value, all in order of appearance in the REST response. As mentioned above, it may be desirable to examine a number N of the attribute values so that a cell width capable of accommodating all values may be chosen. Formatting may be done based on the type of data. Thus, cells might display the value justified left for strings and date types, and justified right for integer types.

Figure 6:
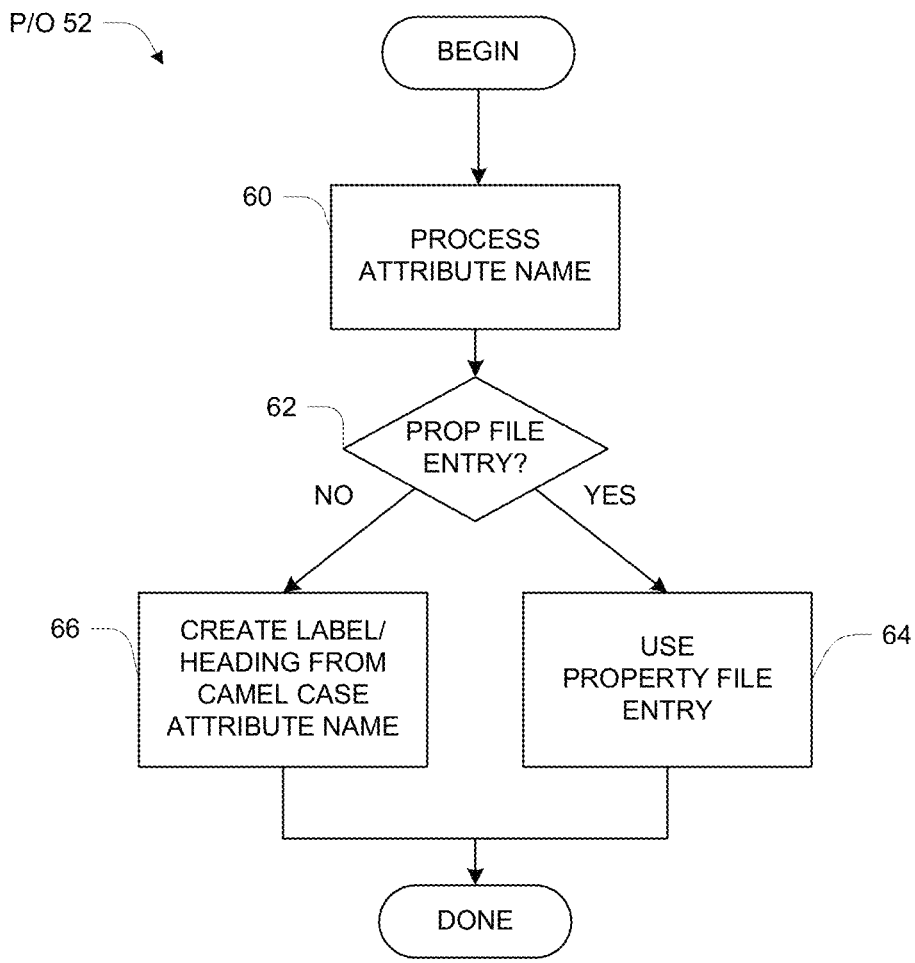

FIG. 6 shows the processing for labels/headings in some additional detail. Generally, a label or heading is created for the attribute name of each attribute in the object, as indicated at 60.

In general, the label or heading to be displayed may be different from the attribute name appearing in the REST response. In the above example, the name "mgmtlP" appears as an attribute name, but it may be desired to display a more user-friendly label, for example the string "Management IP Address". Thus in one embodiment, a local storage structure referred to as a "property file" is used, populated with labels to be used for the display. The attribute name from the REST response may be used as a key to look up a corresponding label in the property file.

Thus at 62, there is a test whether there is an entry in the property file for this attribute name, and if so then at 64 this label is selected for use. If there is no property file or no entry for this attribute name in the property file, then it is necessary to generate a label in some other way. In one embodiment as shown at 66, the label can be generated based on the "camel case" attribute name included in the response (the term "camel case" referring to the use of concatenated words with individual capitalization in terms such as "rackLocation", "productSerialNo", etc.). In one approach, the label can be generated by simply de-concatenating the constituent words of the camel case name. For example, the name "rackLocation" might be converted to the label "Rack Location", properly capitalized and spaced. Other approaches for generating the label based on the camel case attribute name can be used.

Figure 7:
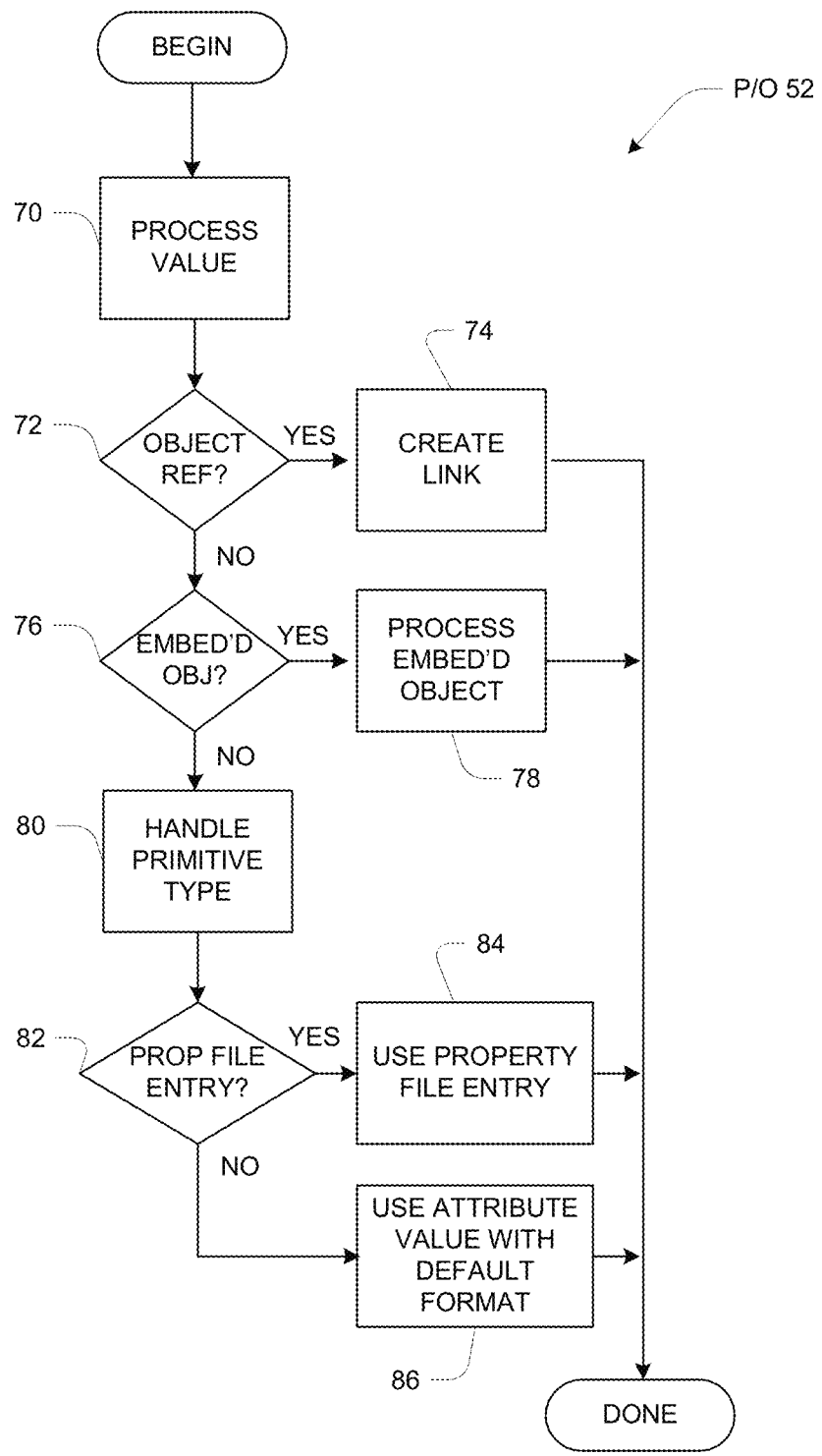

Referring to FIG. 7, beginning at 70 there is processing for the value part of an attribute, to be displayed as either the value part of a label:value pair or as a value in a cell of a table.

At 72 is a test whether the value is a reference to another object (e.g., a URI or URL). If so, a link is created at 74 (typically with link formatting applied). When the value is later displayed, it may be clicked or activated and result in the request for and return of the referenced object, which may itself be the subject of the same automated layout process. For example, if the referenced object is a single object then a new panel may be created to show the attributes of the object.

At 76 is a test whether the value includes an embedded object, and if so then at 78 there is processing of the embedded object for display purposes. For example, if the embedded object is an image, it may need to be scaled in size for suitable display.

If neither test 72 nor 76 is satisfied, then beginning at 80 the value is processed as a primitive type, such as a string, integer, Boolean, etc. At 82 is a test for a corresponding property file entry, which is used at 84 if present. At 86, the value to be displayed is generated more directly from the attribute value in the response. In most cases, the attribute values from the REST response are simply used as is, especially numeric values or others of a relatively unconstrained set. In the case of values selected from a constrained set, however, property file entries or even default mappings may be useful. As an example, an attribute may be a Boolean indicated by a single binary digit, 0 or 1, which is to be displayed using a scheme such as True/False, Present/Absent, etc. These schemes are supported by use of a property file at 84, mapping the 0 and 1 attribute values to the corresponding value strings.

Referring again briefly to step 74, the self reference and @base values in the REST response can be used to create the link that will accompany a displayed value. Referring to the above example, these values can be used to form the following link:

//10.6.7.41/api/instances/storageSystem/APM0000013753

When the link is activated, the above value can be included in an HTTP GET request to obtain the object. Also, the self reference can be used with a DELETE REST call to delete the object in response to the user pressing a link or a Delete button. Also, an edit mode may be allowed where the user changes values and presses Apply Changes button which would send an UPDATE request.

Figure 8:
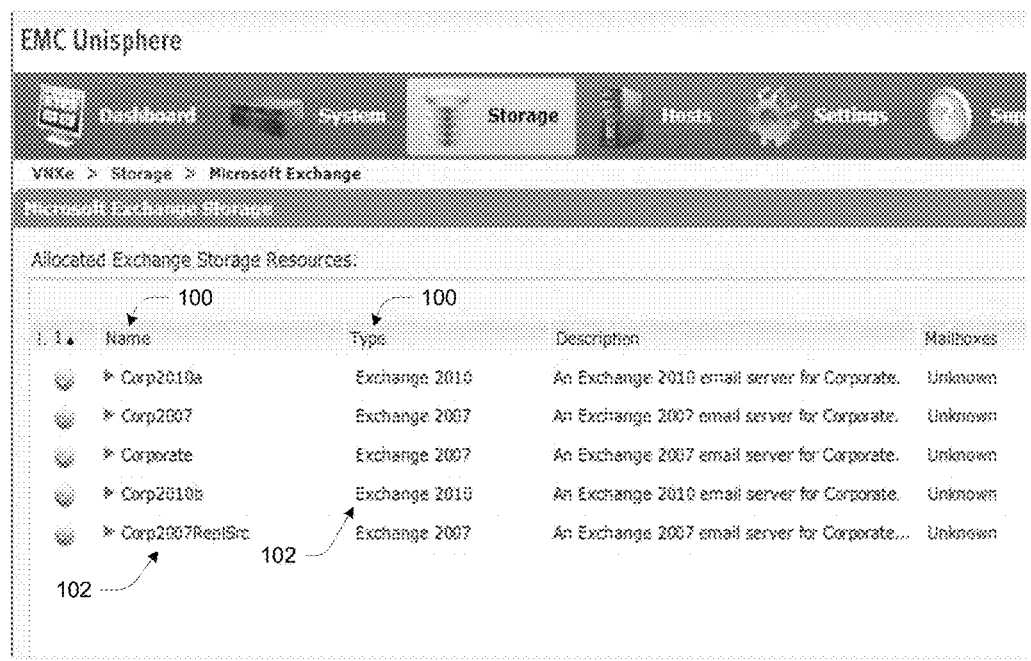
FIGS. 8-9 are screen shots of graphical user interface screens.

FIG. 8 shows an example display window having an auto-generated layout for an array of objects, in this case a set of storage resources used by servers executing an e-mail application known as Microsoft Exchange®. This screen is generated in response to a REST response that includes an array of Exchange server objects, each having a collection of fields including a name (CorpXXXX as shown), a type (Exchange YYYY as shown), a brief description, and other fields. Such a REST response may have been sent in response to a preceding request containing a URI identifying this set of objects, which may have been taken from a link on another page for the "Exchange" storage resources as distinct from other identified storage resources of the storage system. The layout generator 32 follows the procedure of FIG. 4 to create and populate the table that is shown, including the headings 100 as well as the values 102.

Figure 9:
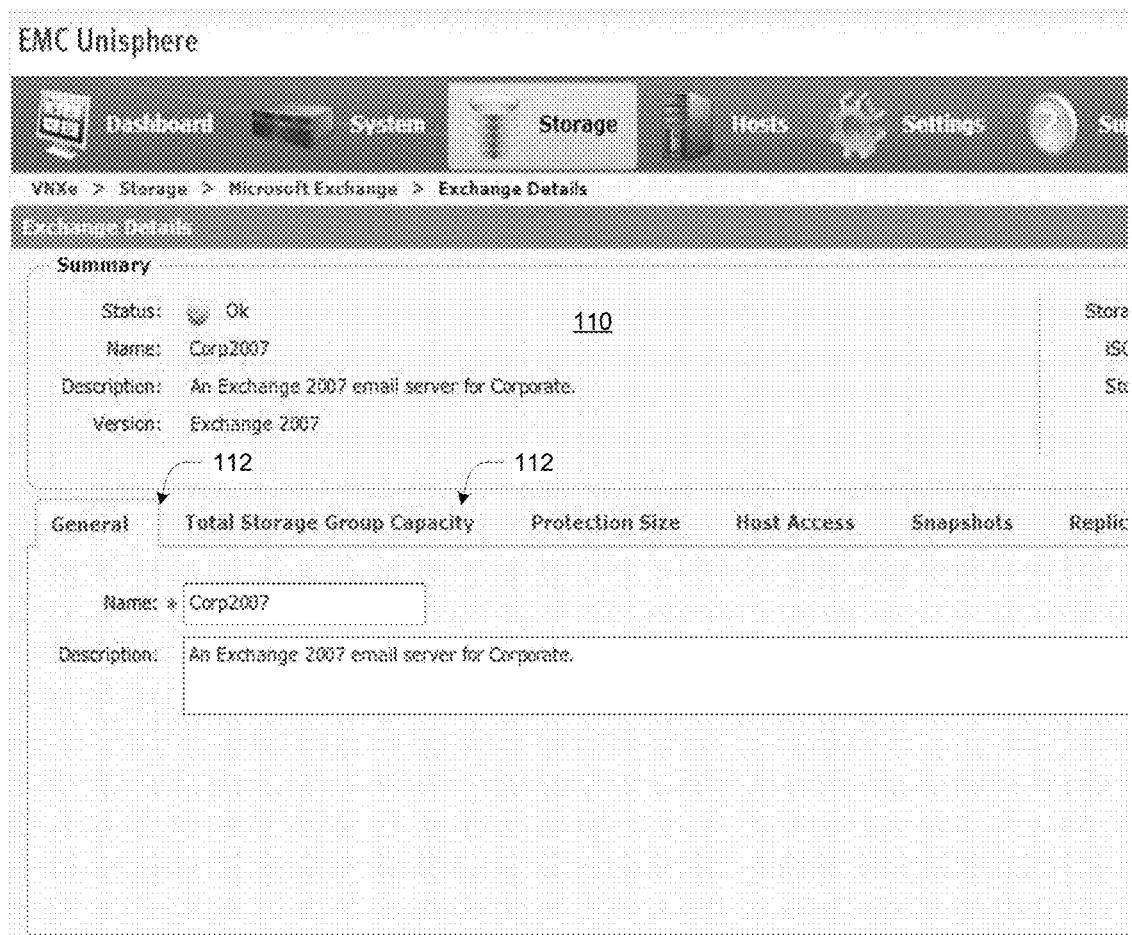

FIG. 9 shows an example of a display for one of the Exchange resources of the display of FIG. 8, which may be generated when the user clicks on one of those resources to activate a corresponding link. In this case, the object is a scalar object and it is displayed using a Summary panel 110 as well as a set of tabbed sub-panels 112 for different aspects of the object—General, Capacity, Protection, Host Access, Snapshots, etc. In the General tab are presented two label:value pairs—the Name and the Description. These are auto-generated based on the presence of the corresponding attributes in the REST response (i.e., name and description attributes, in that order).

Although the description provides specific examples in the form of a user interface of a storage system management application, the techniques herein may be applied in other kinds of client-server systems in which a server provides structured data to be displayed at a client.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a computer having a display and an interface to a network, comprising:

using a request-response protocol over the network to (i) send a resource request to a server application of a remote computer, the resource request requesting object data, and (ii) receive a resource response from the server application of the remote computer in response to the resource request, the resource response including a structured text description of a resource as one or more data objects, each data object including a respective set of attributes each having an attribute name and attribute value, the data objects and the attributes of each data object appearing in the resource response in a display order;

subsequently, in a first layout generating step, (A) determining whether the structured text description of the resource in the resource response includes only a single data object or an array of data objects, and (B) selecting a display format by (1) for the single data object, selecting a form display format and a number of form columns to be used based on (a) the number of attributes of the single data object and (b) a width of label:value pairs to be placed in the form columns to display the attributes of the single data object, and (2) for the array of data objects, selecting a table display format and a number of table columns to be used based on (c) the number of attributes of each data object of the array and (b) respective widths of the table columns for displaying respective attribute values;

in a subsequent second layout generating step, creating a specification of a display object of the selected display format to be rendered in a graphical user interface window on the display, the specification being created to include:

for the form display format, the label:value pairs of the single data object and corresponding location information specifying respective locations of the label:value pairs in the form columns in the graphical user interface window according to the display order of the attributes in the resource response; and for the table display format, a table definition and row data values for the data objects of the array, the table definition including the number of columns and respective column headings corresponding to the attribute names of the data objects in the display order of the attributes in the resource response, each row data value containing the attribute values for a corresponding data object of the array in the display order of the attributes in the resource response, the row data values being ordered according to the display order in the resource response of the respective data objects of the array; and subsequently rendering the display object on the display based on the specification as created.

2. A method according to claim 1, wherein a label used for either a label:value pair or as a column heading for an attribute is obtained from a property file based on the attribute name of the attribute.

3. A method according to claim 2, wherein each attribute name has a mixed-case format of run-together capitalized words, and wherein the label is obtained from the property file only if a corresponding property file entry exists, and otherwise the label used for either the label:value pair or as the column heading for the attribute is generated by processing the attribute name to insert spaces between the capitalized words.

4. A method according to claim 1, wherein each attribute name has a mixed-case format of run-together capitalized words, and wherein a label used for either a label:value pair or as a column heading for an attribute is generated by processing the attribute name to insert spaces between the capitalized words.

5. A method according to claim 1, wherein creating the specification includes specifying formats for displayed values based on respective data types of the displayed values.

6. A method according to claim 1, wherein one or more of the values is an object reference with an associated link activatible by the user to perform a desired action on a referenced object.

7. A method according to claim 6, wherein the desired action is a user-selected one of a plurality of available actions including deletion and modification.

8. A non-transitory computer-readable medium storing computer program instructions, the instructions being executable by a computer including a display and an interface to a network to cause the computer to perform a method including:

using a request-response protocol over the network to (i) send a resource request to a server application of a remote computer, the resource request requesting object data, and (ii) receive a resource response from the server application of the remote computer in response to the resource request, the resource response including a structured text description of a resource as one or more data objects, each data object including a respective set of attributes each having an attribute name and attribute value, the data objects and the attributes of each data object appearing in the resource response in a display order;

subsequently, in a first layout generating step, (A) determining whether the structured text description of the resource in the resource response includes only a single data object or an array of data objects, and (B) selecting a display format by (1) for the single data object, selecting a form display format and a number of form columns to be used based on (a) the number of attributes of the single data object and (b) a width of label:value pairs to be placed in the form columns to display the attributes of the single data object, and (2) for the array of data objects, selecting a table display format and a number of table columns to be used based on (c) the number of attributes of each data object of the array and (b) respective widths of the table columns for displaying respective attribute values;

in a subsequent second layout generating step, creating a specification of a display object of the selected display format to be rendered in a graphical user interface window on the display, the specification being created to include:

for the form display format, the label:value pairs of the single data object and corresponding location information specifying respective locations of the label:value pairs in the form columns in the graphical user interface window according to the display order of the attributes in the resource response; and for the table display format, a table definition and row data values for the data objects of the array, the table definition including the number of columns and respective column headings corresponding to the attribute names of the data objects in the display order of the attributes in the resource response, each row data value containing the attribute values for a corresponding data object of the array in the display order of the attributes in the resource response, the row data values being ordered according to the display order in the resource response of the respective data objects of the array; and subsequently rendering the display object on the display based on the specification as created.

9. A non-transitory computer readable medium according to claim 8, wherein a label used for either a label:value pair or as a column heading for an attribute is obtained from a property file based on the attribute name of the attribute.

10. A non-transitory computer readable medium according to claim 9, wherein each attribute name has a mixed-case format of run-together capitalized words, and wherein the label is obtained from the property file only if a corresponding property file entry exists, and otherwise the label used for either the label:value pair or as the column heading for the attribute is generated by processing the attribute name to insert spaces between the capitalized words.

11. A non-transitory computer readable medium according to claim 8, wherein each attribute name has a mixed-case format of run-together capitalized words, and wherein a label used for either a label:value pair or as a column heading for an attribute is generated by processing the attribute name to insert spaces between the capitalized words.

12. A non-transitory computer readable medium according to claim 8, wherein creating the specification includes specifying formats for displayed values based on respective data types of the displayed values.

13. A non-transitory computer readable medium according to claim 8, wherein one or more of the values is an object reference with an associated link activitible by the user to perform a desired action on a referenced object.

14. A non-transitory computer readable medium according to claim 13, wherein the desired action is a user-selected one of a plurality of available actions including deletion and modification.

15. A computer, comprising:
a display;
an interface to a network providing communications between the computer and a remote computer, the remote computer executing a server application for serving object data to network clients using a request-response protocol over the network; and
processing circuitry operative to execute computer program instructions of a protocol client, a layout generator, and a renderer to cause the computer to perform a method including:
by the protocol client using the request-response protocol over the network, (i) sending a resource request to the server application of the remote computer, the resource request requesting object data, and (ii) receiving a resource response from the server application of the remote computer in response to the resource request, the resource response including a structured text description of a resource as one or more data objects, each data object including a respective set of attributes each having an attribute name and attribute value, the data objects and the attributes of each data object appearing in the resource response in a display order;
subsequently, in a first layout generating step by the layout generator, (A) determining whether the structured text description of the resource in the resource response includes only a single data object or an array of data objects, and (B) selecting a display format by (1) for the single data object, selecting a form display format and a number of form columns to be used based on (a) the number of attributes of the single data object and (b) a width of label:value pairs to be placed in the form columns to display the attributes of the single data object, and (2) for the array of data objects, selecting a table display format and a number of table columns to be used based on (c) the number of attributes of each data object of the array and (b) respective widths of the table columns for displaying respective attribute values;
in a subsequent second layout generating step by the layout generator, creating a specification of a display object of the selected display format to be rendered in a graphical user interface window on the display, the specification being created to include:
for the form display format, the label:value pairs of the single data object and corresponding location information specifying respective locations of the label:value pairs in the form columns in the graphical user interface window according to the display order of the attributes in the resource response; and
for the table display format, a table definition and row data values for the data objects of the array, the table definition including the number of columns and respective column headings corresponding to the attribute names of the data objects in the display order of the attributes in the resource response, each row data value containing the attribute values for a corresponding data object of the array in the display order of the attributes in the resource response, the row data values being ordered according to the display order in the resource response of the respective data objects of the array; and
by the renderer, subsequently rendering the display object on the display based on the specification created by the layout generator.

16. A computer according to claim 15, wherein a label used for either a label:value pair or as a column heading for an attribute is obtained from a property file based on the attribute name of the attribute.

17. A computer according to claim 16, wherein each attribute name has a mixed-case format of run-together capitalized words, and wherein the label is obtained from the property file only if a corresponding property file entry exists, and otherwise the label used for either the label:value pair or as the column heading for the attribute is generated by processing the attribute name to insert spaces between the capitalized words.

18. A computer according to claim 15, wherein each attribute name has a mixed-case format of run-together capitalized words, and wherein a label used for either a label:value pair or as a column heading for an attribute is generated by processing the attribute name to insert spaces between the capitalized words.

19. A computer according to claim 15, wherein creating the specification includes specifying formats for displayed values based on respective data types of the displayed values.

20. A computer according to claim 15, wherein one or more of the values is an object reference with an associated link activatible by the user to perform a desired action on a referenced object.

21. A method according to claim 1, wherein, for the form display format, the number of columns for displaying label:value pairs is specified based on a width of a form panel to be used, a first number of columns being used when the form panel has a portrait-style aspect ratio, a second larger number of columns being used when the form panel has a landscape-style aspect ratio.

22. A method according to claim 21, wherein the first number of columns is one and the second number of columns is more than one.

23. A method according to claim 1, wherein some of the values are selected from a constrained set and have respective first representations in the resource response, and further including, upon encountering the first representations in the resource response, obtaining corresponding mapped values from a property file and including the mapped values in place of the first representations in the specification of the display object.

24. A method according to claim 23, wherein one constrained set is a Boolean set having true and false values whose first representations are respective numeric indicators and whose corresponding mapped values in the property file are respective character strings representing the true and false values.

* * * * *